US011036656B2

(12) United States Patent
McLaughlin et al.

(10) Patent No.: US 11,036,656 B2
(45) Date of Patent: Jun. 15, 2021

(54) I/O MESH ARCHITECTURE FOR AN INDUSTRIAL AUTOMATION SYSTEM

(71) Applicant: Honeywell International Inc., Morris Plaines, NJ (US)

(72) Inventors: Paul Francis McLaughlin, Ambler, PA (US); Christopher Paul Ladas, Doylestown, PA (US); Angela Lee Lordi, Lansdale, PA (US); James Michael Schreder, Perkasie, PA (US); Stanley Robert Gorzelic, Bethleham, PA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/377,239

(22) Filed: Apr. 7, 2019

(65) Prior Publication Data

US 2020/0320024 A1    Oct. 8, 2020

(51) Int. Cl.
*G06F 13/12* (2006.01)
*G05B 19/41* (2006.01)
*G05B 19/418* (2006.01)

(52) U.S. Cl.
CPC ....... *G06F 13/122* (2013.01); *G05B 19/4185* (2013.01); *G05B 19/41865* (2013.01); *G05B 19/41885* (2013.01)

(58) Field of Classification Search
CPC ....... G06F 13/12; G06F 13/122; G05B 19/41; G05B 19/4185; G05B 19/41865; G05B 19/41885
USPC .......................................................... 710/6
See application file for complete search history.

(56) References Cited

U.S. PATENT DOCUMENTS

| 7,436,797 | B2 | 10/2008 | Shepard et al. |
| 9,665,089 | B2 | 5/2017 | Schreder et al. |
| 9,875,207 | B2 | 1/2018 | Lv et al. |
| 9,873,346 | B2 | 5/2018 | McLaughlin et al. |
| 10,178,177 | B2* | 1/2019 | McLaughlin ........... H04L 69/18 |
| 10,237,712 | B2* | 3/2019 | Gopalakrishnan ...... H04L 69/08 |
| 10,441,832 | B1* | 10/2019 | Trivelpiece ........ A62C 99/0072 |
| 10,565,046 | B2* | 2/2020 | Tran Van .............. G06F 11/079 |
| 2015/0278144 | A1 | 10/2015 | McLaughlin et al. |
| 2018/0259923 | A1* | 9/2018 | De ...................... G05B 19/0423 |
| 2018/0324609 | A1 | 11/2018 | Diancin et al. |
| 2019/0104437 | A1* | 4/2019 | Bartfai-Walcott ...... H04L 45/24 |
| 2019/0174207 | A1* | 6/2019 | Celia ...................... H04L 67/12 |
| 2019/0245716 | A1* | 8/2019 | Coombes .............. H04L 47/825 |
| 2019/0274084 | A1* | 9/2019 | Daniels ............. H04W 28/0268 |
| 2019/0340269 | A1* | 11/2019 | Biernat ................. G06F 16/248 |
| 2020/0026575 | A1* | 1/2020 | Guim Bernat .......... G06F 21/64 |

(Continued)

OTHER PUBLICATIONS

Extended European Search Report for corresponding EP Application No. 20166894.4.

*Primary Examiner* — Christopher B Shin
(74) *Attorney, Agent, or Firm* — Paschall & Associates, LLC; Anthony Miologos

(57) ABSTRACT

An industrial automation system employing a mesh topology of input/output allows flexibility in pairing field devices and controllers though the I/O mesh. Field devices can be connected to the geographically closest I/O module channel without regard to the location of the necessary controller. Modular prefabrication and deployment of the I/O modules becomes less complex and less time consuming thereby reducing costs.

18 Claims, 4 Drawing Sheets

(56) References Cited

U.S. PATENT DOCUMENTS

| | | | |
|---|---|---|---|
| 2020/0029086 A1* | 1/2020 | Zou | H04N 19/436 |
| 2020/0236162 A1* | 7/2020 | Bouzon | H04L 67/104 |
| 2020/0333765 A1* | 10/2020 | Biernat | G06F 16/27 |

* cited by examiner

I/O MESH ARCHITECTURE FOR AN INDUSTRIAL AUTOMATION SYSTEM

FIELD OF THE INVENTION

The field of this invention is industrial automation, and in particular a system for an industrial automation system with input/output interfaces accessible in a mesh architecture.

BACKGROUND OF THE INVENTION

Processing facilities, or industrial plants, are typically managed using industrial automation systems. Example processing facilities include manufacturing plants, chemical plants, crude oil refineries, and ore processing plants. Among other things, industrial automation systems often manage the use of industrial equipment in the processing facilities.

Various process industries have seen constant growth in industrial automation technology. In particular, there is a need to move to more capitally efficient systems and to provide designs that have compatibility with modular unit construction techniques.

However, it is often challenging to provide the necessary level of industrial automation while remaining capitally efficient and providing for modular construction. The disclosure herein provides a system that removes typical field junction boxes and deploys more than the traditional I/O in the field. The disclosure provides a system that is compatible with modular construction. Portions of the system may be built as pre-fabricated modules and then shipped to a deployment site. Minimal effort is then required to connect the field I/O systems to a control center. One advantage of this disclosure allows for both inputs and outputs to be communicated through the mesh architecture of the I/O modules. Specifically, the mesh architecture of the I/O modules provides two-way communication, both the inputs and the outputs, between the I/O modules and the controllers. Another significant advantage provided by the I/O mesh architecture herein allows for field devices to connect to the closest field I/O module via an I/O channel while still allowing the I/O channel to pair with an appropriate controller. Different I/O channels of the same I/O module may be paired with different controllers through the mesh architecture.

SUMMARY OF THE INVENTION

The present invention involves a system comprising a plurality of input/output (I/O) interfaces, each I/O interface connected to a plurality of I/O modules, each I/O module comprising a plurality of channels, each channel connected to a field device and configured to receive signals from and transmit signals to the field device, wherein the plurality of channels are connected in a mesh configuration; and a plurality of controllers, wherein each controller is configured to receive signals from and transmit signals to any one of the channels of the mesh configuration. The system may further comprise a supervisory control network configured to receive information and to transmit information to the plurality of controllers. The system may further comprise an I/O network configured to communicate information between the plurality of controllers and the plurality of I/O interfaces, I/O modules and or channels. The field device may be a sensor, actuator, valves, or a processing device. The controller may be an application control system, a field device manager, a remote terminal unit, an embedded controller, a programmable logic controller, a virtual node, or a device for receiving the control information and sending instructions to a field device. The I/O module may further comprise configured fault states for channels and only select channels of an I/O module may be faulted. Connections of the system may comprise Ethernet technology. The I/O modules may be prefabricated and prewired as a module before incorporation into the system. A field device may be connected to a channel of an I/O module that is located geographically close to the field device. At least one I/O interface may be configured to execute basic control functions. At least one I/O interface may be configured to respond to an operator console.

In another embodiment, a system comprises a plurality of input/output (I/O) interfaces connected in a mesh configuration, each I/O interface wirelessly connected to plurality of field devices and configured to receive inputs from and transmit outputs to the field devices; and a plurality of controllers, wherein each controller is configured to receive inputs from and transmit outputs to any one of the field devices through the mesh configuration of I/O interfaces. The field devices can communicate with the I/O interface located geographically close to the field device. At least one I/O interface may be configured to execute basic control functions. At least one I/O interface may be configured to respond to an operator console. The system may further comprise additional I/O interfaces connected to a plurality of I/O modules each having a plurality of channels, the channels connected to additional field devices and all channels configured in a mesh configuration, at least one of the plurality of controllers further connected to at least one channel in the mesh configuration.

In still another embodiment a method comprises configuring a plurality of channels of a plurality of I/O modules in a mesh configuration to form an I/O mesh; communicating inputs from field devices of a plurality of field devices to corresponding channels of the plurality of input/output (I/O) modules; providing the inputs though the I/O mesh to a plurality of controllers, wherein the inputs are communicated to any of the controllers in the plurality of controllers; providing outputs from the plurality of controllers though the I/O mesh to the plurality of channels; wherein the outputs are communicated to any of the channels in the plurality of channels; and communicating the outputs from the channels to the field devices. The inputs may comprise data collected by the field devices and the outputs comprise control strategies provided by the controllers. The method may further comprise pairing a controller with a channel though the I/O mesh. The method may further comprise configuring the I/O modules with fault states for each channel and upon loss of communication with a specific controller and faulting only those channels paired with the specific controller.

Additional objects, embodiments and details of this invention can be obtained from the following drawing and detailed description of the invention.

DETAILED DESCRIPTION

Industrial automation is an important feature of today's industrial processing plants. There is a need for industrial automation systems to continually provide greater flexibility in the implantation and operation of industrial automation systems.

Figure 1:
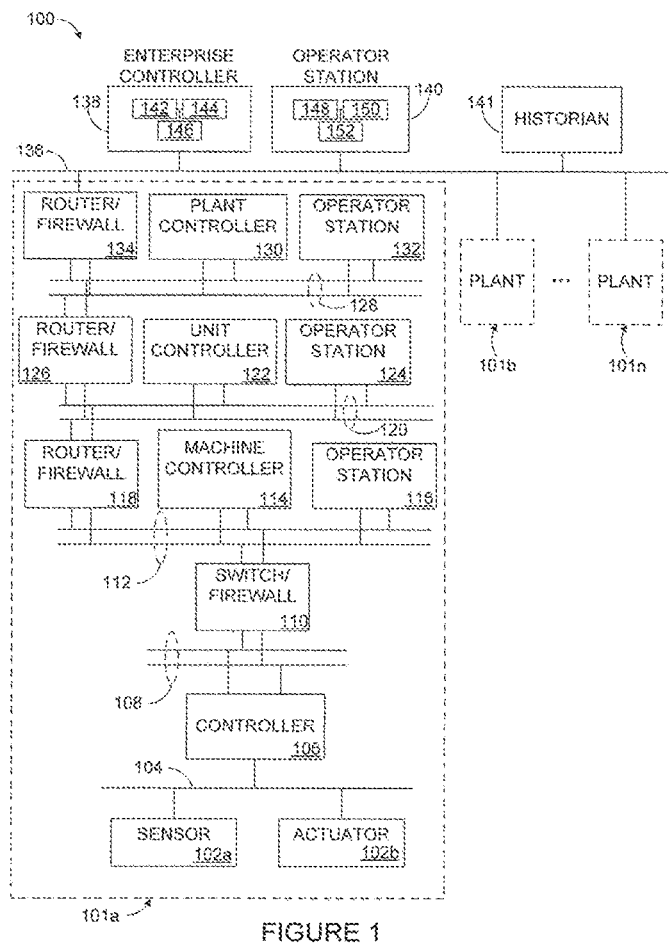
FIG. 1 illustrates an industrial process control and automation system.

FIG. 1 illustrates an example industrial automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. The sensors and actuators may be generally referred to as field devices.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controHers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable, networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102 a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WNDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing Instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

Figure 2:
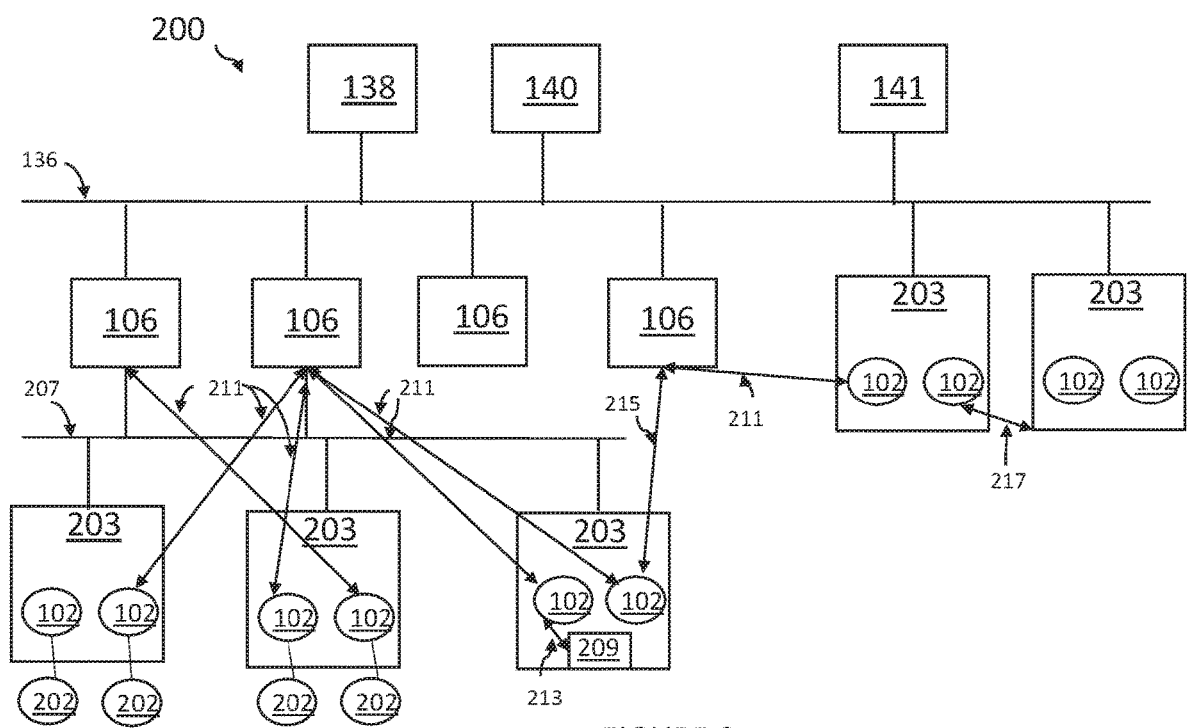
FIG. 2 shows an exemplary mesh topology at the channel level of the I/O modules.
Figure 3:
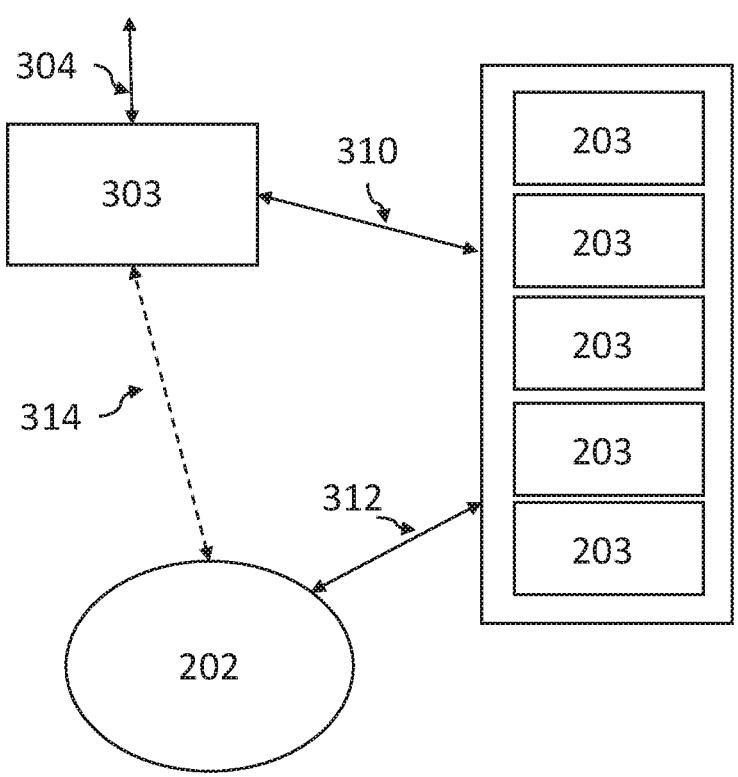
FIG. 3 shows an exemplary mesh topology of the I/O modules including the I/O interface and a wireless embodiment.

An exemplary mesh topology at the channel level of the I/O modules is shown in FIG. 2. Enterprise controller 138, operator station 140, historian 141, network 136, and controllers 106 are as described above with reference to FIG. 1. I/O modules 203 have multiple channels 102 which are connected to field devices 102a and 102b of FIG. 1. One I/O module 203 is shown as further having local control 209. For simplicity, in FIG. 2 I/O interfaces are not shown as separate from the I/O modules but shown as a unit. FIG. 3 shows the relationship of the I/O modules and the I/O interfaces. It is understood that multiple I/O modules may be associated with a single I/O interface, see FIG. 3. A I/O network 207 is shown in addition to network 136. I/O network 207 is a private network. A number of controllers 203 are connected to I/O network 207, while other controllers 106 and I/O modules 203 are connected to network 136.

Typical field devices allow for monitoring manufacturing processes, such as physical attributes, such as temperatures, pressures, flows, etc., as well as providing control over a process, such as opening/closing valves, increasing/relieving pressures, turning up/down heating or cooling units, etc. There is a need to centralize control and information gathering to improve plant efficiency. Each process in the plant has one or more input characteristics, i.e. process conditions, and one or more output characteristics, i.e. control features.

Some industrial automation systems use a distributed control system (DCS) which is a system of sensors, controllers and associated computers that are distributed throughout an industrial plant. DCS systems use methods such as publish/subscribe and request/response to move data from controllers to client servers and applications at a supervisory level. The DCS provides automated decisions based on processing the data in real time or as modified by users in response to analysis of data collected from running processes.

A limitation of many present industrial automation systems, including DSC systems, is that each controller is dedicated or bound to a specific input/output module and the set of channels and field devices associated with the specific input/output module. Sets of channels and associated field devices are fixed by the I/O module's type, the physical location of the I/O module, or the network location of the I/O module. Flexibility is therefore limited. The present disclosure removes that limitation.

FIG. 2 shows that the relationship between one controller and a set of I/O channels is no longer a bound relationship of one controller to a specific set of I/O channels defined by one I/O module, but instead shows the I/O channels of multiple I/O modules to be meshed to a set of control nodes, i.e., controllers. The I/O electronics have been decoupled from one specific controller. Specifically, FIG. 2 shows the I/O modules each having a plurality of channels at a channel level of the I/O module, where the channels of all the I/O modules are connected in a mesh topology. In FIG. 2, not only have the I/O electronics been decoupled from one specific controller, but with the mesh topology at the channel level of the I/O modules, multiple controllers may be related to a single I/O module and the channels within. Each of the multiple of controllers may be connected to one or more channels of a single I/O module.

The I/O mesh is particularly valuable for engineering efficiency when Universal I/O Modules available from Honeywell Process Solutions are employed. Using technology such as that of the Universal I/O Modules, channel types are software configured. The types available to chose from include analog input, analog output, digital input, and digital output. Suitable Universal I/O is described in US2005/0278144.

Multiple advantages are achieved by employing a mesh architecture to the channels of the I/O modules. I/O modules may be located geographically close to the field devices without regard to which specific controller will use those I/O signals and equipment. This advantage supports the current need to simplify designs by removing field junction boxes and deploying more I/O in the field as compared to traditional Control Center and remote instrument enclosure (RIE) deployments.

Another advantage is the ability to use standard Ethernet as a remoting medium, including switched and ring topologies. Employing standard Ethernet technology may allow for greater flexibility, greater stability and reliability, greater security, greater scalability. Further Ethernet connections provide for higher security at the I/O level and is ISA99 certified. However, the disclosure is not limited to Ethernet technology. Other remoting mediums may be employed in combination with Ethernet technology or instead of Ethernet technology.

Still another advantage of the mesh architecture of the channels of the I/O modules is the applicability of the design to modular construction efforts. Modular construction favors building process units as pre-fabricated modules including pre-wired I/O modules at manufacturing facilities. The finished I/O modules are then shipped to the deployment site where minimal effort is required to connect the field I/O module to for, example, the control center. Eliminating the need for pairing one I/O module to a single specific controller will streamline the implementation process and reduce time and costs needed. Field devices may connect to a channel of the closest I/O module while still allowing the I/O channel to pair with the appropriate controller.

The system may be configured to provide tools providing information related to the I/O mesh that is configured and in operation. Such tools may provide views and reports showing the I/O mesh. The vies and reports enable maintenance and troubleshooting actions to be carried out with full understanding of the I/O mesh and its impact on the operation.

At a high-level view, FIG. 2 comprises a system 200 that includes a plurality of I/O modules 203 wherein each I/O module is connected to a plurality of field devices 202 though channels 102 of the I/O modules 203. A channel provides one datum of an industrial process. Process data from field devices or process control strategy instructions to field devices are referred to herein as channels. Channels 102 are configured in a mesh topology. FIG. 2. Shows representative field devices 202 although each I/O module 203 may be connected through channels 102 to a plurality of field devices 202 even if not shown. Hundreds of field devices 202 may be connected to I/O module 203 through channels 102. Field devices 202, are devices for generating process information, or for actuating process units through control of valves, regulators, or other processing devices. Exemplary field devices 202 can be sensors, actuators, or other processing devices, such as valves, flow controllers and other equipment. The mesh topology allows for signals to and from the channels, and therefore to and from the field devices, to reach a necessary controller regardless of the I/O module a channel is associated with. Multiple controllers may be controlling outputs of different channels that belong to the same I/O module. Similarly, Multiple controllers may be controlling inputs of different channels that belong to the same I/O module. Connections may be though, for example, Ethernet technology or wireless technology.

System 200 further includes a plurality of controllers 106. Each controller 106 is configured to receive signals from and transmit signals to any one of the plurality of channels 102 within the plurality of I/O modules 203, wherein the channels 102 are connected in a mesh topology. Just as each channel 102 represents a datum of a process, that datum is destined for a specific controller 106. With the channels 102 configured in a mesh topology, the specific datum in a specific channel can be connected to the proper specific controller 106 regardless of which I/O module the channel resides in. In other words, data collected from field devices via channels is available to any controller though the mesh topology of the channels. Similarly, signals or instructions from the controller may be available to any channel though the mesh topology of the channels.

Each controller 106 generates an information stream for further processing. In some embodiments the controllers 106 may be arranged with electronic interconnection topologies, such as through ethernet technology. Suitable topologies include, but are not limited to, a ring topology and a star topology. The ring topology comprises an interconnection of the controllers wherein each controller is in communication with two other controllers. A star topology is wherein one or more controllers are interconnected with the remaining controllers. When employing these topologies, it is not required for each controller to be interconnected to all other controllers. In one embodiment each controller is connected to at least one or two other controllers. Using controller topologies such as these, controllers can also share information between each other. Exemplary controllers include an application control system, a field device manager, a remote terminal unit, embedded controllers, programmable logic controllers, virtual nodes, or another device for receiving information and sending instructions to a field device 202. The controller 106 can be operated through a human machine interface, or through a pre-programmed automated system.

System 200 further includes network 136, which can be a supervisory control network, for directing information streams to and from the controllers 106. Network 136 receives the information stream from the controllers 106 and transmits control strategy information to the controllers 106. When a requesting node needs a datum from a responding node, it issues a request for the datum across the network and the responding node then returns the datum back across the network. Network 136 as a supervisory control network comprises a supervisory control computer and interfacing hardware to enable communication and control between a client server and the industrial plant.

System 200 can further include a data center housing enterprise controller 138, operator station 140, and/or historian 141 for receiving and storing the information stream from the network 136. Sorted data can be later retrieved for analysis. Data storage can be a local storage, a remote storage, or a cloud storage.

One or more of I/O modules 203 or I/O interfaces may be capable of executing level-1 basic control functions. Basic control functions interact with I/O channels and the I/O interface can mesh with other controllers at the same time. Local control and the I/O interface mesh can both coexist. The local control function is shown in FIG. 2 as local control 209.

With the mesh topology of the channels of the I/O modules, FIG. 2 shows connections between controllers 106 and the channels 102 of I/O modules 203 may occur in multiple different ways. For example, connections 211 show controllers 106 connected to different channels 102 of different I/O modules 203. One controller 106 may be connected to multiple channels 102 within the same I/O module 203. I/O modules interface I/O to the system over a network. The network may be, for example, a supervisory network or a private I/O network. A controller connected to network 136 may be connected to a channel 102 of an I/O module also connected to network 136. A controller connected to network 136 may be connected to a channel 102 of an I/O module connected to I/O network 207 via connection 215. An I/O module 203 having channel 102 and local control 209 may have connection 213 between channel 102 and local control 209 of I/O module 203.

I/O modules 203 provide associated channels 102 with a configured fault state when communication to the upstream controller is lost. Outputs in particular are more sensitive to faults. Previously, where one controller is assigned to one specific I/O module, the fault handling is at the I/O module level. If communication is lost to the controller, all channels of the I/O module would be considered in a failed state, i.e., detecting a communication failure, and engage the failsafe handling protocol as established by the configured fault state. However, with the channels configured in a mesh topology, faults are detected and handled on a per-channel basis and not on an I/O module basis. So, if communications are lost to only one of the upstream controllers, then only those channels of an I/O module in communication with the specific "lost" controller would be considered in a failed state, or faulted, and engage the failsafe fault handling protocol. Other channels of the I/O module would continue normal operational. If a channel does not have an associated control algorithm, such as when communication to a controller is lost, a safety action may be automatically prescribed by the configured fault state to move the field device into a failsafe state. For example, if a fuel valve field device loses communication with the controller, the fuel vale may be automatically shut off. Advantageously, with the mesh topology of the channels 102, the fault handling is at the channel level and not the I/O module level.

Turning to FIG. 3, I/O modules 203 are connected to a plurality of field devices 202 though connections 312. I/O modules 203 are also connected to an I/O interface 303 through connections 310. I/O interface connects to a network via 304. As mentioned above, the field devices may connect with the channels of the I/O module and the I/O interface all though Ethernet technology such as connections 310 and 312. In another embodiment, information from at least some field devices may be collected though wireless technology and communicated to the I/O interface though connection 314 and made available to the I/O mesh. In this embodiment, wired and wireless field devices may be supported in the same system. The system may be a hybrid where some of the connections are wireless as shown by connection 314 for those field devices equipped with wireless capability, while other connections are through Ethernet technology as shown by connections 310 and 312.

Figure 4:
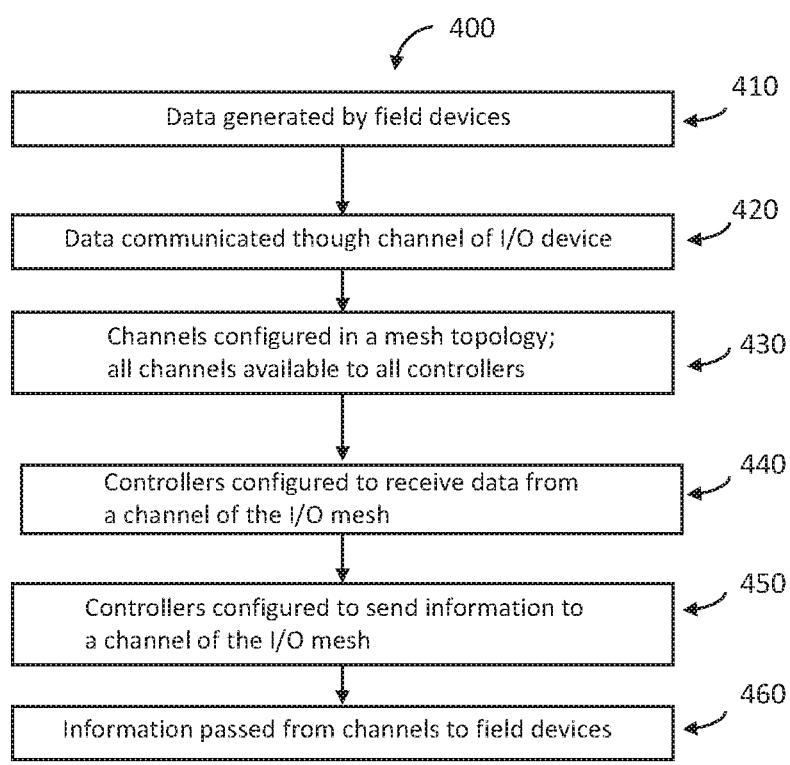
FIG. 4 illustrates the interactions and configurations of field devices, channels of I/O devices, and the controllers within an industrial automation system.

FIG. 4 summarizes the interactions and configurations of the field devices, the channels of the I/O device, and the controllers within system 400. Field devices generate data streams in 410. The data streams are passed though channels of I/O modules in communication with the field devices in 420. The channels of I/O modules are configured in a mesh topology wherein all channels are available to all controllers in 430. Controllers are configured to receive data from a channel of the I/O mesh in 440. Controllers are also configured to send information to a channel of the I/O mesh in 450. Information is passed from channels of the I/O mesh to field devices in 460.

This system allows for a very flexible architecture where all, some, or no computer equipment or server equipment is located at the physical plant site for the industrial automation system. Examples of suitable architecture types for use with this invention include, Service Oriented Architecture, EXPERION Virtual Engineering Platform from Honeywell International Inc., Open Virtual Engineering Platform, EXPERION DSA technology from Honeywell International, Inc., island-mode remote auxiliary stations, remote fault tolerance ethernet (FTE) process control network capability, robust/secure control communications, and Control Mesh architecture.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An industrial automation system comprising:
   a plurality of input/output (I/O) interfaces, each I/O interface connected to a plurality of I/O modules, each I/O module comprising a plurality of channels, each channel connected to a field device and configured to receive signals from and transmit signals to the field device, wherein the plurality of channels of the I/O modules are connected in a mesh configuration to form an I/O mesh;
   a plurality of controllers, wherein each controller is configured to connect to and receive signals from and transmit signals to any one of the channels of each I/O modules of the mesh configuration,
   an I/O network communicatively connected between the plurality of controllers and the plurality I/O modules, at least one of the plurality of controllers transmitting control instructions to any one channel of the plurality of channels of any one of the plurality of I/O modules and the plurality of controllers receiving control information from any one channel of the plurality of channels of any one of the plurality of I/O modules, wherein each channel represents a datum of a process, each datum using a specific channel connected to a specific controller based on the plurality of channels of the I/O modules configured in the mesh configuration; and
   wherein at least one of the plurality of controllers receives control information from the I/O network and transmits control instructions through the I/O network, along any one of the connected channels to an associated field device.

2. The system of claim 1 further comprising a supervisory control network configured to receive information and to transmit information to the plurality of controllers.

3. The system of claim 1 wherein the field device is a sensor, actuator, valves, or a processing device.

4. The system of claim 1 wherein the controller is an application control system, a field device manager, a remote terminal unit, an embedded controller, a programmable logic controller, a virtual node, or a device for receiving the control information and sending instructions to a field device.

5. The system of claim 1 wherein the I/O module further comprises configured fault states for channels and only select channels of an I/O module may be faulted.

6. The system of claim 1 further comprising a tool providing information regarding the mesh configuration.

7. The system of claim 1 wherein connections comprise Ethernet technology.

8. The system of claim 1 wherein the I/O modules are prefabricated and prewired as a module before incorporation into the system.

9. The system of claim 1 wherein a field device is connected to a channel of an I/O module that is located geographically close to the field device.

10. The system of claim 1 wherein at least one I/O interface is further configured to execute basic control functions.

11. An industrial automation system comprising:
    a plurality of input/output (I/O) interfaces connected in a mesh configuration, each I/O interface wirelessly connected to plurality of field devices and configured to receive inputs from and transmit outputs to the field devices, wherein the plurality of channels of the I/O modules are connected in the mesh configuration to form an I/O mesh;
    a plurality of controllers, wherein each controller is configured to connect to and receive inputs from and transmit outputs to any one of the field devices through the mesh configuration of I/O interfaces,
    an I/O network communicatively connected between the plurality of controllers and the plurality I/O modules, at least one of the plurality of controllers transmitting control instructions to any one channel of the plurality of channels of any one of the plurality of I/O modules and the plurality of controllers receiving control information from any one channel of the plurality of channels of any one of the plurality of I/O modules, wherein each channel represents a datum of a process, each datum using a specific channel connected to a specific controller based on the plurality of channels of the I/O modules configured in the mesh configuration; and
    wherein at least one of the plurality of controllers receives control information from the I/O network and transmits control instructions through the I/O network, along any one of the connected channels to an associated field device.

12. The system of claim 11 wherein the field devices communicate with the I/O interface located geographically close to the field device.

13. The system of claim 11 wherein at least one I/O interface is configured to execute basic control functions.

14. The system of claim 11 further comprising additional I/O interfaces connected to a plurality of I/O modules each having a plurality of channels, the channels connected to additional field devices by ethernet technology and all channels configured in a mesh configuration, at least one of the plurality of controllers further connected to at least one channel in the mesh configuration.

15. A method in an industrial automation system comprising:
    configuring a plurality of channels of a plurality of I/O modules in a mesh configuration to form an I/O mesh;
    communicating inputs from field devices of a plurality of field devices to corresponding channels of the plurality of input/output (I/O) modules;

providing the inputs though the I/O mesh to a plurality of controllers, wherein the inputs are communicated to any of the controllers in the plurality of controllers;

providing outputs from the plurality of controllers though the I/O mesh to the plurality of channels; wherein the outputs are communicated to any of the channels in the plurality of channels;

communicating the outputs from the channels to the field devices, providing an I/O network communicatively connected between the plurality of controllers and the plurality I/O modules, at least one of the plurality of controllers transmitting control instructions to any one channel of the plurality of channels of any one of the plurality of I/O modules and the plurality of controllers receiving control information from any one channel of the plurality of channels of any one of the plurality of I/O modules wherein each channel represents a datum of a process, each datum using a specific channel connected to a specific controller based on the plurality of channels of the I/O modules configured in the mesh configuration; and wherein at least one of the plurality of controllers receives control information from the I/O network and transmits control instructions through the I/O network, along any one of the connected channels to an associated field device.

16. The method of claim 15 wherein the inputs comprise data collected by the field devices and the outputs comprise control strategies provided by the controllers.

17. The method of claim 15 further comprising pairing a controller with a channel though the I/O mesh.

18. The method of claim 17 further comprising configuring the I/O modules with fault states for each channel and upon loss of communication with a specific controller and faulting only those channels paired with the specific controller.

* * * * *